US012597294B1

(12) United States Patent
Barner et al.

(10) Patent No.: US 12,597,294 B1
(45) Date of Patent: Apr. 7, 2026

(54) LIVENESS DETECTION FOR VIDEO CALLS

(71) Applicant: UIPCO, LLC, San Antonio, TX (US)

(72) Inventors: Robert Wilson Barner, San Antonio, TX (US); Gavin Keith Armstrong, Morrison, CO (US); Bryan J. Osterkamp, New Braunfels, TX (US); Justin Dax Haslam, San Antonio, TX (US); Salvador Adrian Bretado, San Antonio, TX (US); Andrew Carlos Potts, Saratoga Springs, UT (US); Lisa Michelle Kirch, Ponte Vedra Beach, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 298 days.

(21) Appl. No.: 18/345,486

(22) Filed: Jun. 30, 2023

(51) Int. Cl.
| | |
|---|---|
| *G06V 40/40* | (2022.01) |
| *G06V 20/40* | (2022.01) |
| *G06V 40/18* | (2022.01) |
| *G06V 40/20* | (2022.01) |
| *H04L 67/54* | (2022.01) |

(52) U.S. Cl.
CPC .............. *G06V 40/40* (2022.01); *G06V 20/46* (2022.01); *G06V 40/18* (2022.01); *G06V 40/20* (2022.01); *H04L 67/54* (2022.05)

(58) Field of Classification Search
None
See application file for complete search history.

(56) References Cited

U.S. PATENT DOCUMENTS

| | | | |
|---|---|---|---|
| 9,041,766 B1 * | 5/2015 | Gates | H04N 7/15 |
| | | | 348/14.08 |
| 12,333,863 B1 * | 6/2025 | Zhang | G06V 40/176 |
| 2009/0027485 A1 * | 1/2009 | Erhart | H04N 7/144 |
| | | | 348/14.12 |
| 2014/0214335 A1 * | 7/2014 | Siefert | A61B 5/0205 |
| | | | 702/19 |
| 2015/0070516 A1 * | 3/2015 | Shoemake | H04N 21/4542 |
| | | | 348/207.11 |
| 2015/0334344 A1 * | 11/2015 | Shoemake | H04N 7/14 |
| | | | 348/14.16 |
| 2016/0100314 A1 * | 4/2016 | Chung | H04L 63/0861 |
| | | | 713/186 |

(Continued)

*Primary Examiner* — Delomia L Gilliard
(74) *Attorney, Agent, or Firm* — Potomac Law Group, PLLC; Dannon G. Allbee

(57) ABSTRACT

As remote working has become more prevalent, video calls have become increasingly popular. However, various methods have been introduced to circumvent liveness in video calls, such as by playing a prerecorded video stream of a user; thus the user is not actually in attendance in the video call. Aspects of the present disclosure address this problem and others by detecting liveness in video calls. Some implementations can obtain biometric data from users during the video call to confirm that is user is indeed at the computing device streaming the video call. Some implementations can detect looping in the video stream of the user, such as by observing a repeated blinking pattern. Some implementations can prompt the user for a live response, such as by answering a question, and/or can determine that the user's behavior is inconsistent with the behavior of other users in the video call.

20 Claims, 10 Drawing Sheets

(56)            References Cited

U.S. PATENT DOCUMENTS

| | | | | |
|---|---|---|---|---|
| 2016/0350724 | A1* | 12/2016 | Tang | G06Q 10/1095 |
| 2017/0061251 | A1* | 3/2017 | Fan | G06V 10/774 |
| 2017/0223109 | A1* | 8/2017 | Shoemake | H04W 76/10 |
| 2017/0295404 | A1* | 10/2017 | Meredith | H04N 21/252 |
| 2021/0256281 | A1* | 8/2021 | Henson | G06V 40/16 |
| 2022/0030080 | A1* | 1/2022 | Parra | H04L 67/535 |
| 2023/0073410 | A1* | 3/2023 | Tussy | G06F 21/32 |
| 2023/0419728 | A1* | 12/2023 | Miller | G16H 30/40 |
| 2024/0414018 | A1* | 12/2024 | Phillips | H04L 12/1831 |

* cited by examiner

LIVENESS DETECTION FOR VIDEO CALLS

TECHNICAL FIELD

The present disclosure is directed to applying liveness detection, such as loop detection, response prompting, and movement pattern recognition, for video calls.

BACKGROUND

In recent years, remote working has become more prevalent. Although remote working can be more convenient for many people, productivity and creativity can decrease without the ease of in-person collaboration. Thus, applications, such as those for video calls, have been developed that allow users to virtually work together. Such video conferencing can give the feel of an in-person meeting, despite the users' remote locations.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

As remote working has become more prevalent, video calls have become increasingly popular. However, various methods have been introduced to circumvent liveness in video calls, such as by playing a prerecorded video stream of a user, such that the user is not actually in live attendance. Aspects of the present disclosure address this problem and others by detecting liveness in video calls. Some implementations can obtain biometric data from users during the video call to confirm that is user is indeed at the computing device streaming the video call, such as pulse data, breathing data, fingerprint data, etc. Alternatively or additionally, some implementations can detect looping in the video stream of the user, such as by observing a repeated blinking or movement pattern at certain intervals. Some implementations can prompt the user for a live response, such as by answering a question or making a gesture, and/or can determine that the user's behavior is inconsistent with the behavior of other users in the video call.

Implementations of the present technology provide a specific improvement in the field of video calling on computing systems and networks. With the sharp increase in the number of video calls, users have found sophisticated methods to imitate presence in a meeting, such as by playing prerecorded video feeds of the user in a loop while the meeting is conducted. Such methods allow users to circumvent attendance at virtual meetings, even when attendance is required. Thus, some implementations apply algorithms and techniques to identify video feeds of users that are prerecorded, and/or otherwise identify that users within a video call are not live. For example, some implementations can cause computing devices to capture biometric information indicative of liveness of the user, and/or can prompt users to respond to notifications or stimuli to prove their liveness. Some implementations can provide notifications to a host of video call that a video feed is prerecorded, allowing the host to terminate a user's access to the video call, and/or some implementations can terminate the user's access to the video call automatically. Thus, implementations can conserve processing and network resources, and improve latency on the video call.

Figure 1:
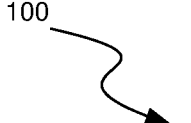
FIG. 1 is a block diagram illustrating an overview of devices on which some implementations can operate.
Figure 1:
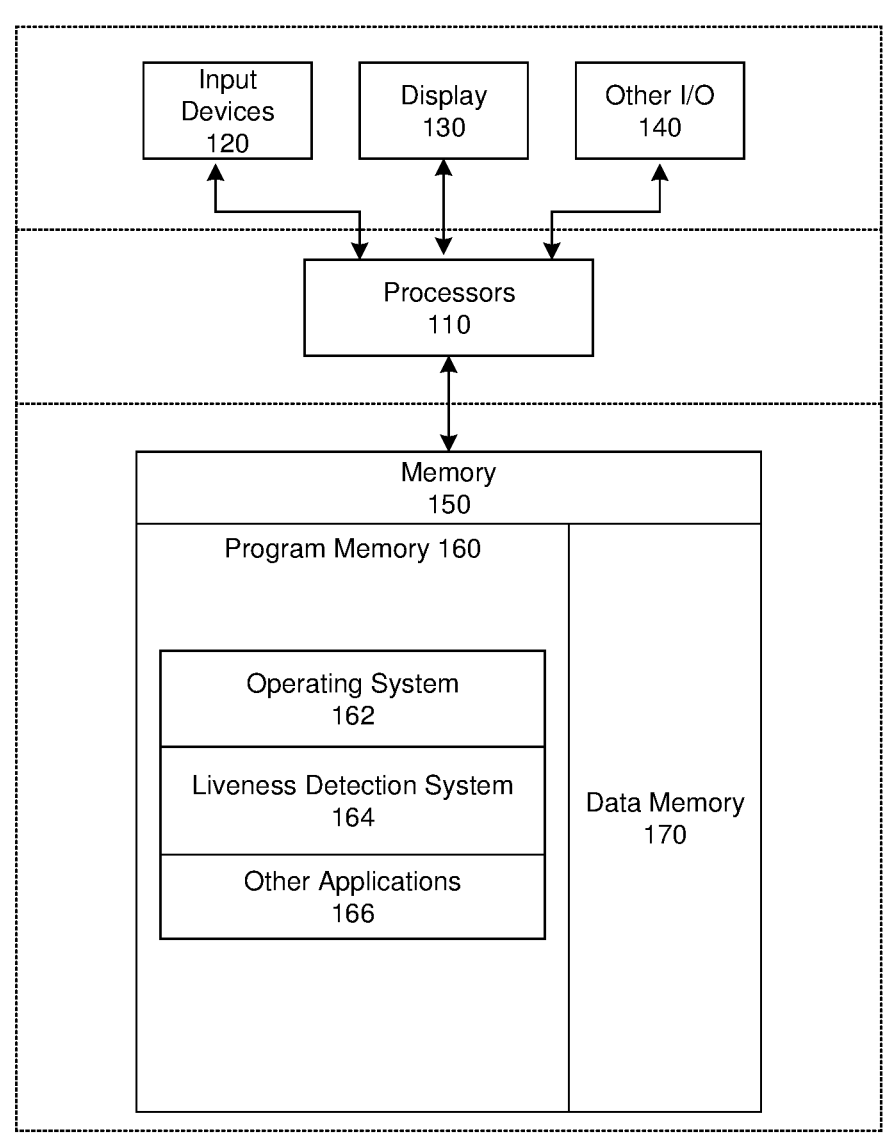

Several implementations are discussed below in more detail in reference to the figures. FIG. 1 is a block diagram illustrating an overview of devices on which some implementations of the disclosed technology can operate. The devices can comprise hardware components of a device 100 that can provide liveness detection in video calls. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, liveness detection system 164, and other application programs 166. Memory 150 can also include data memory 170, e.g., rendering data, video feed data, motion pattern detection data, object recognition data, facial recognition data, biometric data, prompt data, response data, movement pattern data, notification data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
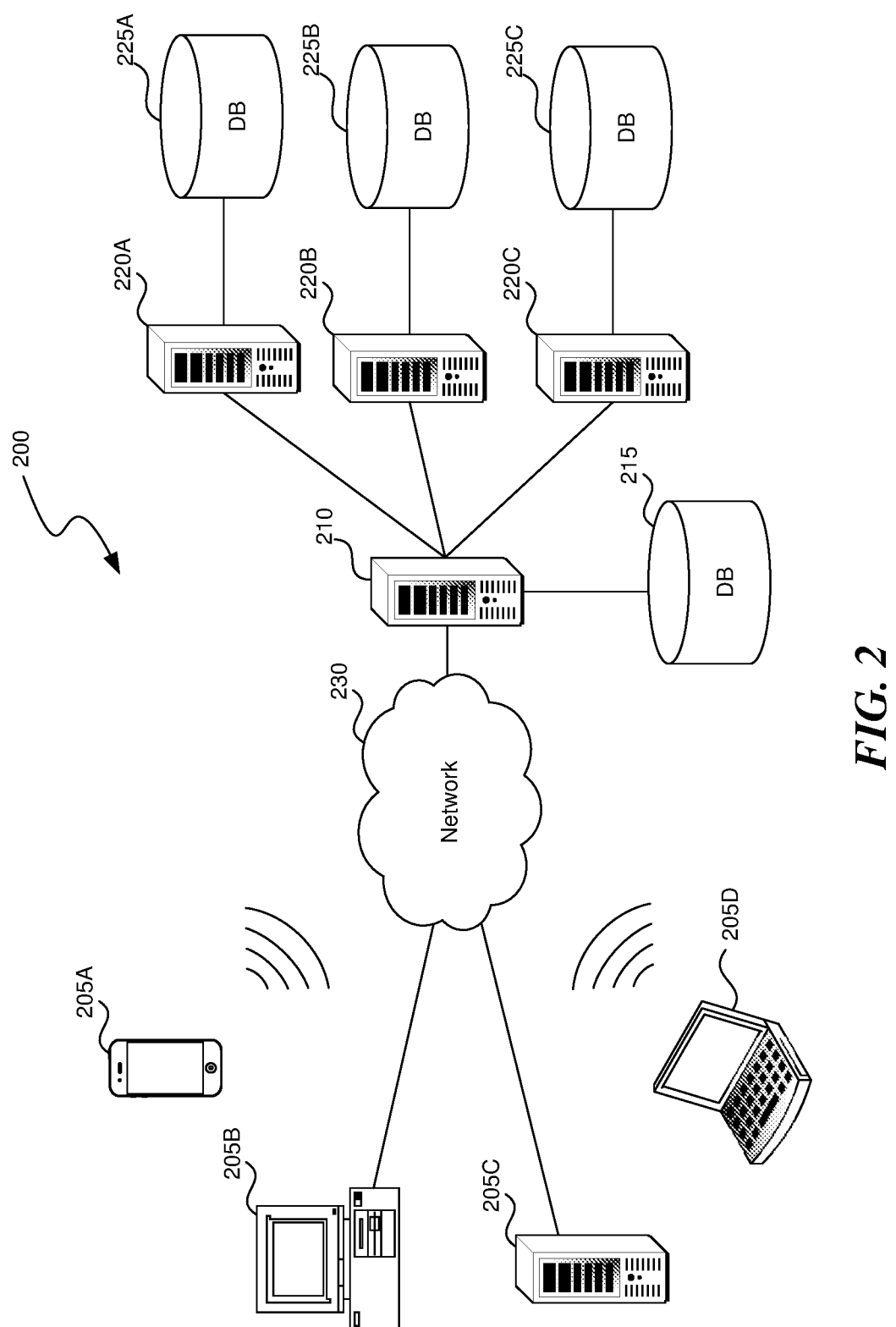
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as rendering data, video feed data, motion pattern detection data, object recognition data, facial recognition data, biometric data, prompt data, response data, movement pattern data, and/or notification data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
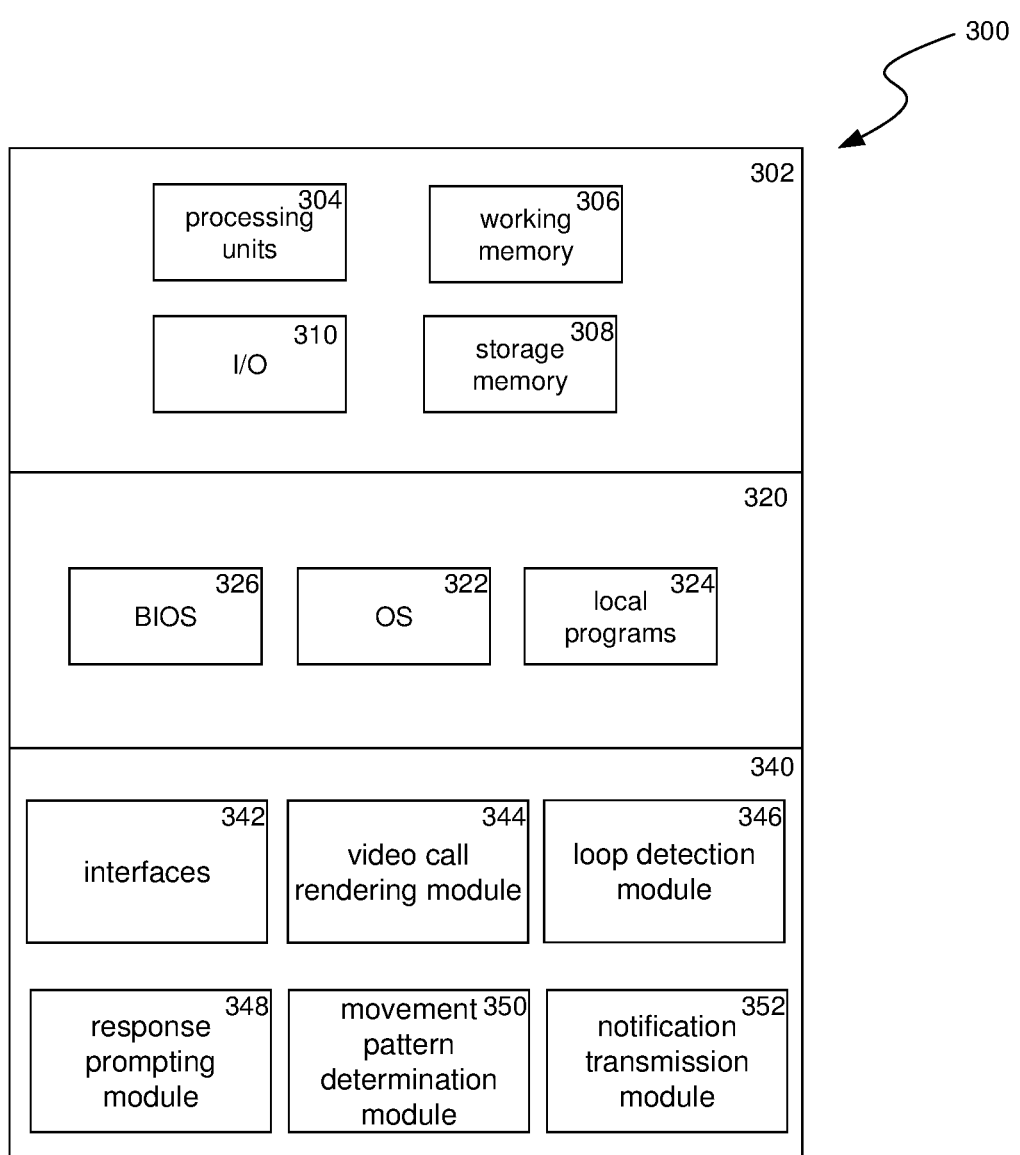
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include video call rendering module 344, loop detection module 346, response prompting module 348, movement pattern determination module 350, notification transmission module 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Video call rendering module 344 can facilitate rendering of multiple video feeds corresponding to multiple users in a video call. The multiple users can access the video call from respective computing devices. Video call rendering module 344 can facilitate rendering of the multiple video feeds by, for example, providing instructions and/or rendering data needed to display the video feeds on the computing devices. In some implementations, video call rendering module 344 can facilitate rendering of the multiple video feeds by providing raw audio and/or video data representative of the video call, such that the video call can be rendered on the computing devices. In some implementations in which specialized components 340 are included in a computing device of a user accessing the video call, video call rendering module 344 can itself cause display of the video call on the computing device using such data. In some implementations in which specialized components 340 are included in a central computing device (e.g., a server computing device managing the video call), video call rendering module 344 can facilitate display of the video call on the computing devices by providing such data. Further details regarding facilitating rendering of video feeds corresponding to users in a video call are described herein with respect to block 402 of FIG. 4.

Loop detection module 346 can determine that a user in the video call is prerecorded by detecting a repeated motion pattern, of a user in a video feed (e.g., a video feed rendered by video call rendering module 344), at a particular interval. The repeated motion pattern can be of any motion of the user, such as a gesture made at expiration of a particular period of time (e.g., every 5 minutes), that is unlikely to be repeated at the same interval over the length of the video call. Loop detection module 346 can identify a repeated motion pattern by analyzing displayed movements of the user in the video feed over a period of time. For example, the repeated motion pattern can include a blinking pattern, a breathing pattern, a pulse pattern, a speaking pattern (e.g., movements of the mouth), and/or any other movement pattern of the body of the user that is repeated in the same manner periodically.

In some implementations, loop detection module 346 can detect the repeated motion pattern in response to a determination that the user has not audibly engaged in the video call for a predetermined period of time. However, in some implementations, loop detection module 346 can analyze the video feeds of all of the users in the video call to determine whether a loop is detected regardless of audible engagement. Further details regarding determining that a video feed of a user in a video call is prerecorded, by detecting a repeated motion pattern of a user in a video feed at a particular interval, are described with respect to block 404 of FIG. 4.

Response prompting module 348 can determine that a video feed of a user in the video call is prerecorded by providing a prompt to the user and determining that the user's response is not an expected response. In some implementations, response prompting module 348 can prompt the user to provide a biometric response. For example, response prompting module 348 can prompt the user to provide a pulse via an infrared camera, a smart wristband, etc. In another example, response prompting module 348 can prompt the user to provide a blinking pattern or breathing pattern, which can be captured by one or more cameras. In another example, response prompting module 348 can prompt the user to provide a fingerprint on demand, which can be captured by a camera or scanner, such as a fingerprint scanner. In still another example, response prompting module 348 can cause the computing device to increase light emitted from the computing device and detect eye dilation of the user as a response. In still another example, response prompting module 348 can prompt the user to make a particular selected gesture, speak a selected word, etc., on demand. In some implementations, response prompting module 348 can cause the computing device to stop capturing, and/or cause one or more other computing devices to stop rendering, the video feed of the user while prompting the user and awaiting a response.

In some implementations, response prompting module 348 can prompt the user for a response based on a determination that the user has not audibly engaged in the video call for a predetermined period of time. However, in some implementations, response prompting module 348 can prompt all of the users in the video call for a response, regardless of their level of interaction in the video call. Further details regarding determining that a video feed corresponding to a user is prerecorded, by providing a prompt to a user and comparing a response to an expected response, are described herein with respect to block 406 of FIG. 4.

Movement pattern determination module 350 can determine that a video feed corresponding to a user is prerecorded by determining that the user has a movement pattern inconsistent with a movement pattern of other users in the video call. For example, movement pattern determination module 350 can analyze the video feed of the user, along with other video feeds of the other users in the video call, to determine particular actions and/or reactions taken by the users at particular points in the video call. For example, movement pattern determination module 350 can determine that the other users in the video call are waving at the beginning of the video call, while the video feed of the user shows the user disengaged. In another example, movement pattern determination module 350 can determine that the other users in the video call are smiling or laughing, while the video feed of the other user shows that the user is unreactive. In some implementations, movement pattern determination module 350 can observe the video feed of the user over time to determine that the movements of the user are inconsistent with the movements of the other users over a threshold period of time, for a threshold number of times, etc., before determining that the video feed is prerecorded.

In some implementations, movement pattern determination module 350 can determine whether the user's movement pattern is inconsistent with the other users based on a determination that the user has not audibly engaged in the video call for a predetermined period of time. However, in some implementations, movement pattern determination module 350 can determine whether the movement patterns of all or multiple of the users in the video call are inconsistent, regardless of their level of interaction in the video call. Further details regarding determining that a video feed corresponding to a user is prerecorded, by determining that the user has a movement pattern inconsistent with a movement pattern of other users, are described herein with respect to block 408 of FIG. 4.

Notification transmission module 352 can transmit a notification, to at least one computing device of at least one respective user in the video call, that the video feed corresponding to the user is prerecorded. Notification transmission module 352 can transmit the notification over any suitable network, such as network 230 of FIG. 2. The notification can include, for example, the name or another identifier of the user having the prerecorded video feed, along with an indication that the user is not live. In some implementations, notification transmission module 352 can transmit the notification to at least a hosting user of the video call, e.g., the user organizing or initiating the video call. In some implementations, notification transmission module 352 can transmit the notification to one or more other computing devices accessing the video call, such as all of the computing devices accessing the video call. In some implementations in which notification transmission module 352 is implemented on a central computing system, notification transmission module 352 can transmit the notification to the computing device of the user having the prerecorded video feed. In some implementations, receiving such a notification can cause the computing device to end the video call. Further details regarding transmitting a notification, to a computing device of a respective user in a video call, that a video feed corresponding to a user is prerecorded are described herein with respect to block 410 of FIG. 4.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
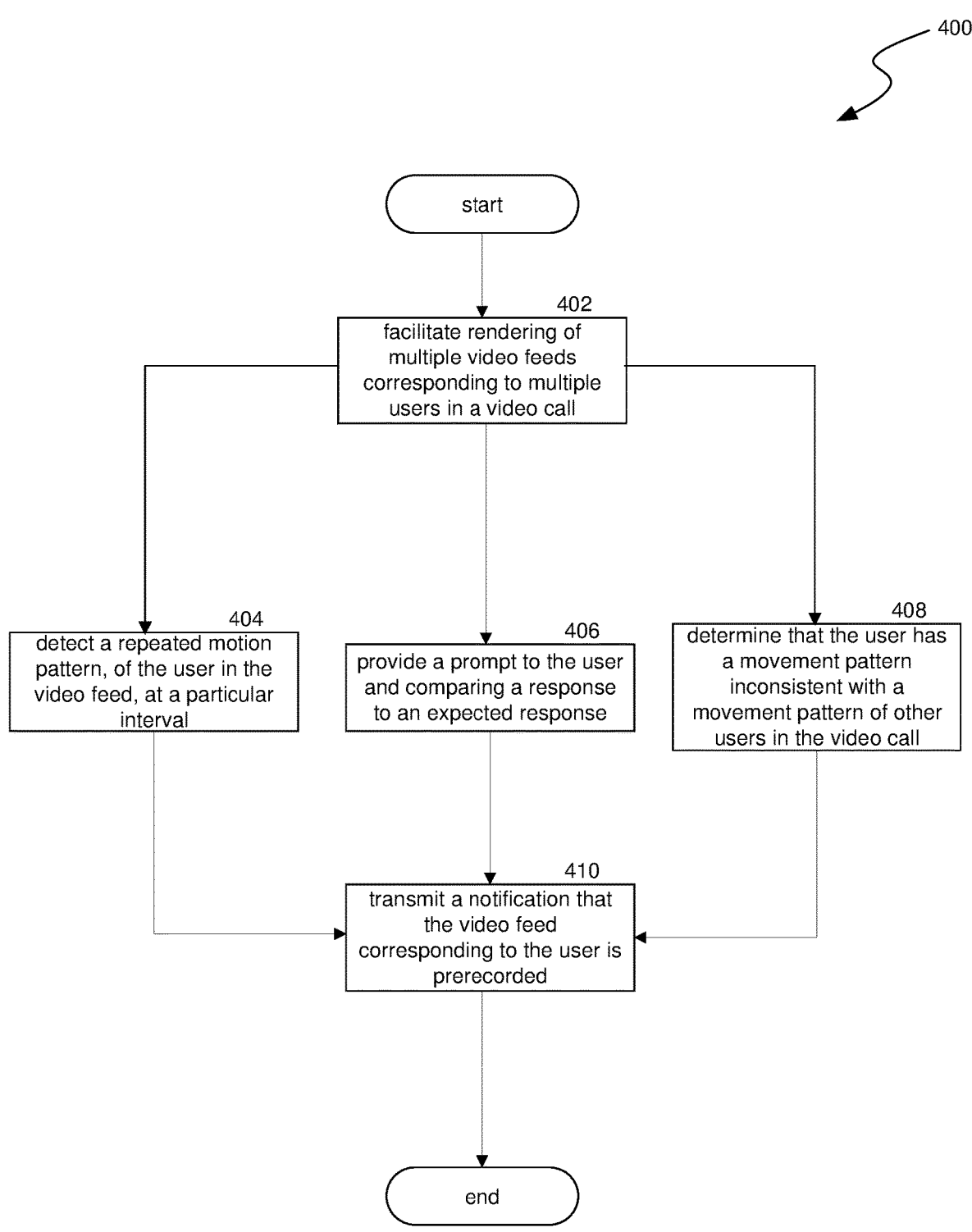
FIG. 4 is a flow diagram illustrating a process used in some implementations for providing liveness detection in video calls.

FIG. 4 is a flow diagram illustrating a process 400 used in some implementations for providing liveness detection in video calls. In some implementations, process 400 can be performed while a video call is being executed on two or more computing devices. In some implementations, process 400 can be performed as a response to a user-level or system-level request to detect liveness of one or more users in the video call, such as on demand, periodically, or upon occurrence of certain conditions. In some implementations, process 400 can be performed by a computing device of a user accessing the video call. In some implementations, process 400 can be performed by a central computing system hosting the video call for multiple users via respective computing devices. In some implementations, process 400 can be performed by liveness detection system 164 of FIG. 1.

At block 402, process 400 can facilitate rendering of multiple video feeds corresponding to multiple users in a video call. Each of the multiple users can access the video call from a computing device. In some implementations, two or more users can access the video call from the same computing device, such as when accessing the video call from a conference room or other shared space. The computing devices can include any devices suitable for accessing, executing, and/or rendering a video call, such as devices that include streaming audio and video capture and display capabilities (e.g., devices that include a camera, a microphone, and speakers). For example, the computing devices can include desktop computers, laptop computers, tablets, mobile phones, specialized video conferencing devices, and/or the like.

At blocks 404-408, process 400 can determine whether a video feed corresponding to a user is prerecorded. In some implementations, process 400 can determine whether the video feed corresponding to the user is prerecorded based on a lack of participation of the user in the video call. For example, process 400 can determine whether the video feed corresponding to the user is not live based on a lack of audible participation by the user in the video call for a threshold period of time. In another example, process 400 can determine whether the video feed corresponding to the user is not live based on other indicators of inattentiveness of the user, such as based on the user turning off her video feed for greater than a threshold amount of time, muting her microphone for greater than a threshold period of time, turning off her speakers for greater than a threshold period of time, etc.

For example, at block 404, process 400 can determine that a video feed is prerecorded by detecting a repeated motion pattern, of the user in the video feed, at a particular interval. The repeated motion pattern can include any motion that is unlikely to repeated at discrete, identifiable intervals, and/or is unlikely to have the same characteristics when repeated. For example, in some implementations, the repeated motion pattern can include a repeated pulse pattern. A pulse pattern can be provided by the user to process 400 via his computing device, e.g., by transmitting an echocardiogram waveform purporting to correspond to his pulse. Upon receipt of the pulse pattern, process 400 can analyze the pattern to determine whether it is a repeated loop of a previously captured pulse, e.g., by looking at the frequency, amplitude, and/or other unique characteristics of the waveform that reoccur at a predetermined interval, e.g., every minute. If process 400 determines that the pulse pattern is a repeated pulse pattern, process 400 can determine that the video feed corresponding to the user is not live, and that the submitted pulse is a prerecorded pulse pattern. An exemplary repeated pulse pattern is shown and described herein with respect to FIG. 6.

Alternatively or additionally, in some implementations, the repeated motion pattern can include a repeated breathing pattern. In some implementations, process 400 can observe a breathing pattern from the video feed of the user and/or the user's audio feed corresponding to the video feed. For example, process 400 can analyze the video feed to identify periodic rising and falling of the chest, and/or can analyze the audio feed to identify noises corresponding to breathing (e.g., using a machine learning process trained on known breathing noises). By identifying the breathing pattern over a period of time, process 400 can generate a table or waveform illustrating the points in time of the breaths and/or intervals between breaths observed in the video feed. Process 400 can then identify a repeated breathing pattern of the user if the points in time and/or intervals between breaths are repeated, e.g., over every 5 minutes, thereby corresponding to a prerecorded, looped video. If process 400 determines that the breathing pattern is repeated, process 400 can determine that the video feed is not live.

Alternatively or additionally, in some implementations, the repeated motion pattern can include a repeated blinking pattern. In some implementations, process 400 can observe a blinking pattern from the video feed of the user. For example, process 400 can analyze the video feed to identify one or both eyes of the user (e.g., using object recognition techniques), then observe the identified eyes for a blinking motion. Process 400 can identify blinking motions using any suitable method, such as, for example, identifying when the sclera, pupil, and/or iris of the eyes is no longer visible, and/or by applying machine learning techniques trained on known blinking motions. By identifying the blinking pattern over a period of time, process 400 can generate a table or waveform illustrating the points in time of the blinking and/or intervals between blinks observed in the video feed. Process 400 can then identify a repeated blinking pattern of the user if the point in time and/or intervals between blinks are repeated, e.g., every 90 seconds, thereby corresponding to a prerecorded, looped video feed. If process 400 determines that the blinking pattern is repeated, process 400 can determine that the video feed is not live. Further details regarding performing object recognition and/or machine learning techniques to identify eye(s) and blinking of a user are described herein with respect to FIG. 7.

Alternatively or additionally to performing block 404, at block 406, process 400 can determine that a video feed is prerecorded by providing a prompt to the user, and comparing the user's response to an expected response. In some implementations, the prompt can request that the user provide biometric input via the respective computing device. The biometric input can include, for example, a pulse, a breathing pattern, a blinking pattern, a fingerprint, a body temperature, a blood oxygen level, and/or any other suitable biometric data indicative of the liveness of the user in the video call. In some implementations, the computing device of the user can collect the biometric input. Alternatively or additionally, one or more other devices in operable communication with the computing device, such as a mobile phone, a wearable device, etc., can collect the biometric input. The one or more other devices can include one or more sensors configured to collect biometric data of the user, such as cameras, electromyography (EMG) sensors, fingerprint scanners, sensors of an inertial measurement unit (IMU), temperature sensors, audio sensors, etc.

In some implementations, process 400 can determine that the video feed is prerecorded if no response is given to the prompt, e.g., no biometric data is provided. For example, process 400 can prompt the user to provide a fingerprint scan, and can determine that the user is not live in the video call if the fingerprint is not provided or the fingerprint does not correspond to the user. In some implementations, process 400 can determine that the video feed is prerecorded if the biometric data provided is outside a normal or expected range, e.g., a reported oxygen level of 10%. In some implementations, process 400 can provide similar prompts to one or more other users in the video call, or all of the users in the video call.

In some implementations, the prompt can cause the computing device to collect biometric data of the user automatically. For example, the prompt can cause an increase in light emitted from the computing device, and the expected response can include eye dilation of the user. If the eyes of the user are not detected, or the eyes do not dilate, process 400 can determine that the user is not live in the video call. In another example, the prompt can cause activation of an infrared camera, and the expected response can include a body temperature of the user and/or a pulse of a user. If the body temperature and/or pulse is not detected, and/or the detected temperature and/or pulse is outside a normal or expected range, process 400 can determine that the user is not live in the video call. For example, process 400 can activate an infrared camera on the computing device, detect a temperature of 70 degrees, determine that such a temperature is inconsistent with a human reading, and determine that the user is not in front of the computing device during the video call.

In some implementations, providing the prompt at block 406 can include prompting the user to perform a gesture. Performance (or nonperformance) of the gesture by the user can be captured, for example, by one or more cameras integral with or in operable communication with the computing device. In some implementations, performance (or nonperformance) of the gesture can be captured by the same camera purportedly capturing images of the user in the video call. In some implementations, when the user is prompted to perform the gesture, process 400 can cause the computing device to pause or turn off video transmission, such that performance of the gesture does not interrupt the video call.

In some implementations, when the user is prompted to perform the gesture, process 400 can cause the computing devices of one or more of the other participants of the video call to pause video rendering of the user, such that performance of the gesture does not interrupt the video call. In some implementations, process 400 can prompt the user to make a particular gesture by performing an action having a corresponding reaction, such as displaying a joke (e.g., which would cause the user to laugh), playing a loud sound (e.g., which would cause the user to become startled), etc.

In some implementations, process 400 can identify whether or not the gesture was performed by, for example, performing object recognition on the image(s) captured by the camera to identify particular motions consistent with the prompted gesture, such as with the hands, fingers, face, etc. Alternatively or additionally, process 400 can identify whether or not the gesture was performed by, for example, obtaining data from one or more wearable devices. In some implementations, the one or more wearable devices can include one or more electromyography (EMG) sensors generating waveforms of electrical activity of the user's muscles, which can be compared to known waveforms associated with known gestures, to thereby identify whether the gesture was made. In some implementations, the one or more wearable devices can include one or more inertial measurement unit (IMU) sensors (e.g., an accelerometer, a gyroscope, etc.) that can capture waveforms corresponding motions of the user's body. Process 400 can then compare such waveforms to waveforms associated with known gestures to thereby identify whether the gesture was made. In some implementations, process 400 can apply a machine learning process trained on waveforms associated with known motions to the EMG waveforms and/or IMU waveforms to determine whether the gesture was made. In some implementations, the user's response to the prompt can be the user performing a different gesture or not performing any gesture responsive to the prompt, thereby indicating that the user is not live.

In some implementations, providing the prompt at block 406 can include prompting the user to speak one or more words. For example, process 400 can cause the computing device of the user to display a message instructing the user to speak a particular word. Process 400 can then cause the computing device to capture, via one or more microphones integral with or in operable communication with the computing device, the user's response. In some implementations, the same microphone used to purportedly capture audio of the user in the video call can capture the user's response. When an audible response is made by the user, process 400 can perform speech recognition techniques to identify any words spoken by the user, and determine whether they correspond to the instructed word(s). If the captured words do not correspond to the instructed words, process 400 can determine that the user is not live in the video call. In some implementations, if no words are captured (i.e., no input is received from the user in response to the prompt), process 400 can determine that the user is not live in the video call. In some implementations, when the user is prompted to speak the word(s), process 400 can cause the computing device to pause or turn off audio transmission, such that speaking of the word(s) does not interrupt the video call. In some implementations, when the user is prompted to speak the word(s), process 400 can cause the computing devices of one or more of the other participants of the video call to pause audio rendering of the user, such that speaking of the word does not interrupt the video call.

Alternatively or additionally to blocks 404 and 406, at block 408, process 400 can determine that the user has a movement pattern inconsistent with a movement pattern of other users in the video call. In some implementations, process 400 can analyze video and/or audio feeds of users within the video call to determine particular movement and/or reaction patterns occurring concurrently amongst the other participants in the video call. For example, process 400 can identify that the other users in the video call laughed at a particular time, while the user did not. In another example, process 400 can identify that the user is inattentive, e.g., looking away and/or turned away from the camera, while the other users are looking at their respective cameras. In another example, process 400 can identify that the other users are smiling at a particular time, while the user is not. Based on the determination that the user has a movement pattern inconsistent with a movement pattern of other users in the video call, process 400 can determine that the user is not live in the video call, i.e., that the video feed is prerecorded. An exemplary inconsistent movement pattern is shown and described with respect to FIG. 5B.

At block 410, process 400 can transmit a notification, to at least one computing device of at least one respective user, indicating that the video feed corresponding to the user is prerecorded. For example, process 400 can transmit the notification to the computing device associated with the host of the video call (e.g., the computing device setting up or initiating the video call), which can be displayed on that computing device. In another example, process 400 can transmit the notification to all of the computing devices of users accessing the video call live. An exemplary notification indicating that a video feed corresponding to a user is prerecorded is shown and described herein with respect to FIG. 5D.

In some implementations, one or more of the users receiving the notification can terminate the prerecorded user's access to the video call. In some implementations, process 400 can automatically terminate the prerecorded user's access to the video call upon determination that the user is not live in the video call, thereby conserving processing and network resources, improving latency on the remaining computing devices accessing the call, and conserving display resources required to render the video feed of the prerecorded user.

Figure 5A:
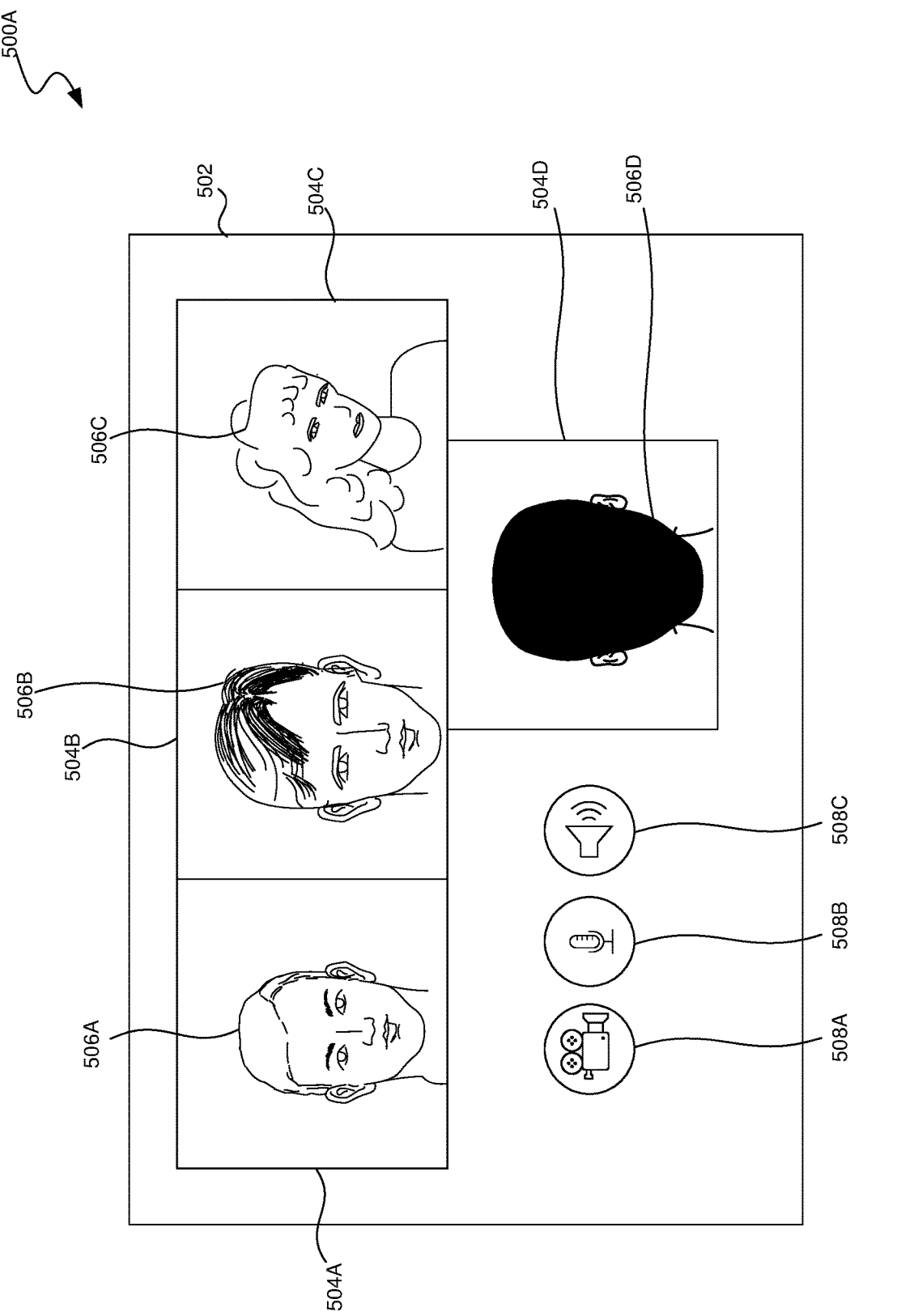
FIG. 5A is a conceptual diagram illustrating an example view on a computing device of a video call.

FIG. 5A is a conceptual diagram illustrating an example view 500A on a computing device of a video call 502. Video call 502 can include video feeds 504A-D of users 506A-D, respectively. Video call 502 can further include user controls 508A-C; i.e., user control 508A for turning video capture on or off, user control 508B for turning audio capture one or off, and user control 508C for adjusting the volume in video call 502. Although illustrated as particular user controls 508A-C, it is contemplated that video call 502 can include any alternative or additional user controls or interfaces relevant to video call 502, such as recording, screen sharing, transcribing, text chat, etc. Further, although shown with respect to four users 506A-D, it is contemplated that video call 502 can include any number of users, and/or that example view 500A can include any number of the two or more users within video call 502.

In some implementations, a liveness detection system (e.g., liveness detection system 164) can continuously monitor video feeds 504A-D to detect the liveness of users 506A-D, respectively, in video call 502, using one or more of the methods described herein. In some implementations, the liveness detection system can periodically monitor video feeds 504A-D to detect the liveness of users 506A-D, respectively, in video call 502, such as at a predetermined interval (e.g., every 5 minutes, 15 minutes into video call 502, when video call 502 starts, etc.). In some implementations, the liveness detection system can monitor video feeds 504A-D on-demand to detect the liveness of users 506A-D, respectively, in video call 502, such as when requested by a host of video call 502 (e.g., user 506D), or when a system lifecycle event occurs.

Figure 5B:
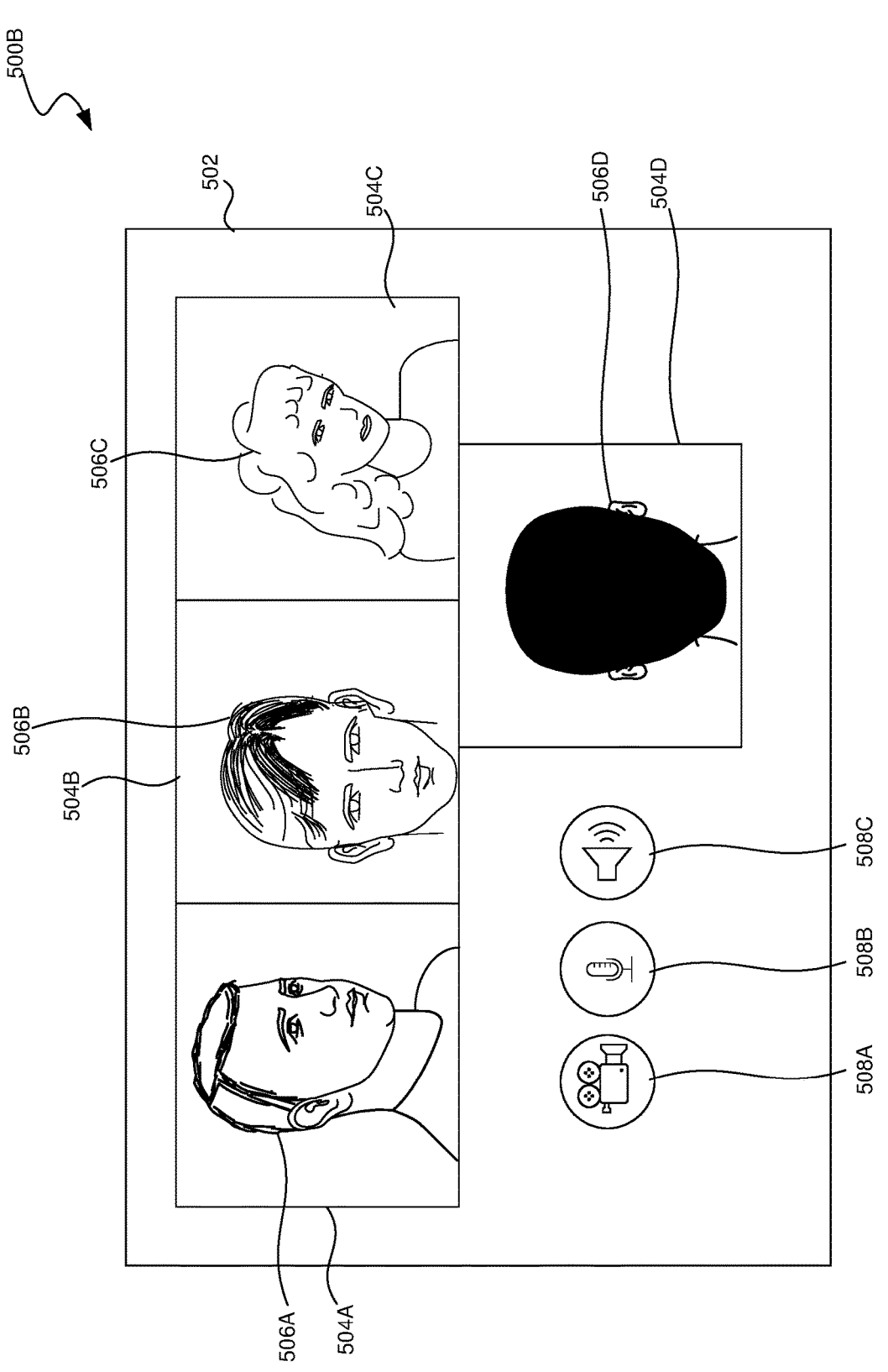
FIG. 5B is a conceptual diagram illustrating an example view on a computing device of a video call in which a user has a movement pattern, inconsistent with a movement pattern of other users, indicative of the user not being live in the video call.

FIG. 5B is a conceptual diagram illustrating an example view 500B on a computing device of a video call 502 in which a user 506A has a movement pattern, inconsistent with a movement pattern of other users 506B-D, indicative of the user not being live in the video call. In some implementations, a liveness detection system (e.g., liveness detection system 164) can determine that video feed 504A of user 506A is prerecorded by analyzing video feeds 504A-D to determine that the motions of user 506A are different than motions of the remainder of users 506B-D. For example, users 506B-D can be smiling and looking at their respective cameras on their respective computing devices (e.g., based on conversation within video call 502, based on a prompt displayed on the computing devices instructing or causing users 506A-D to smile, etc.). Meanwhile, user 506A can have a serious expression and be looking away from his respective camera, showing lack of engagement in video call 502, unlike users 506B-D. Based on user 506A's inconsistent behavior in video call 502, in some implementations, the liveness detection system can determine that user 506A is not live, or may not be live, in video call 502.

Figure 5C:
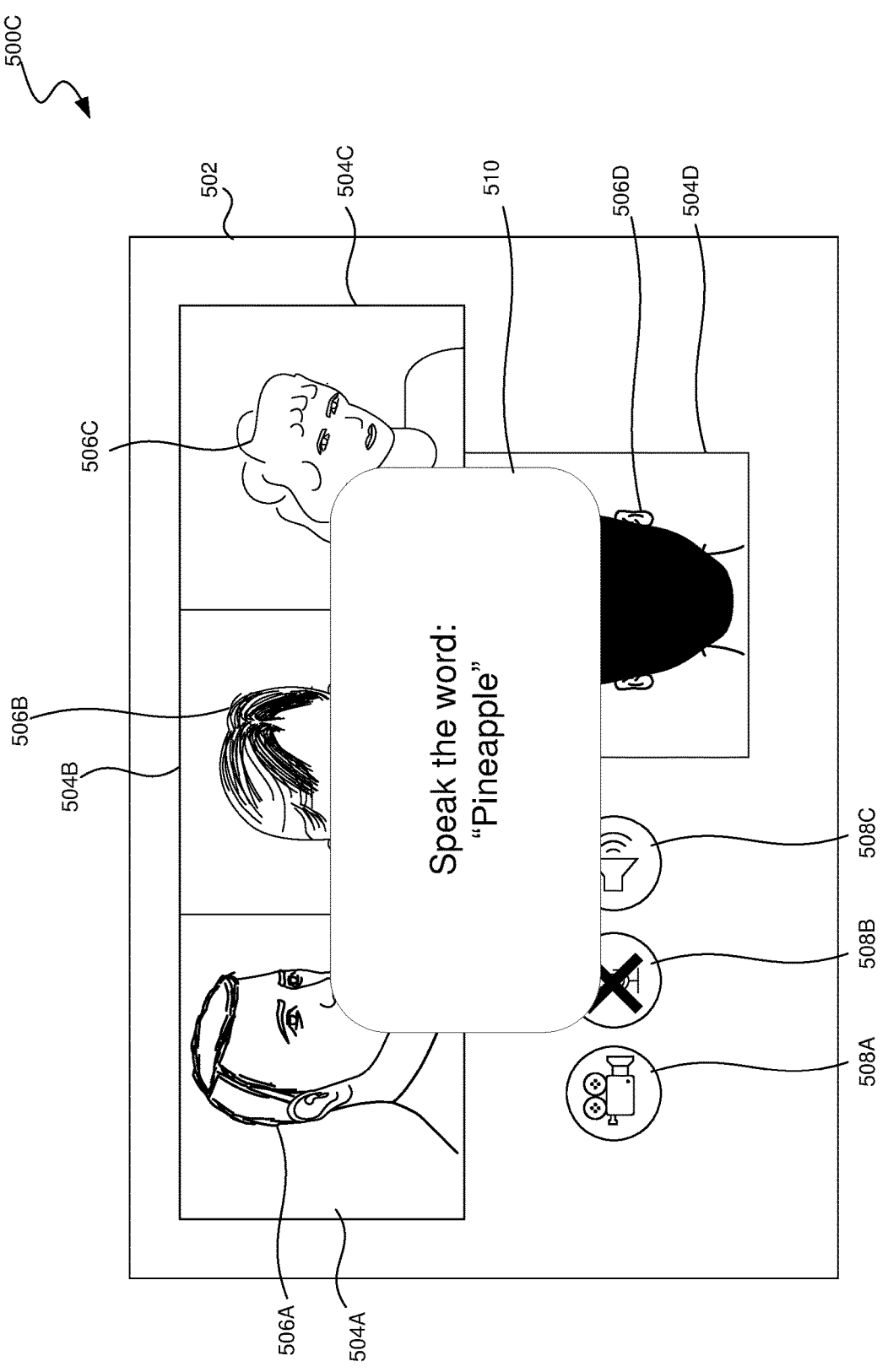
FIG. 5C is a conceptual diagram illustrating an example view on a computing device of a video call in which a user is prompted to speak a word to determine liveness of the user in the video call.

FIG. 5C is a conceptual diagram illustrating an example view 500C on a computing device of a video call 502 in which a user 506A is prompted to speak a word to determine liveness of the user 506A in the video call 502. Example view 500C, including prompt 510, can be rendered on the computing device of user 506A based on any of a number of factors. For example, prompt 510 can be displayed on the computing device of user 506A based on user 506A's lack of audible participation in video call 502 for a threshold amount of time. In another example, prompt 510 can be displayed on the computing device of user 506A based on user 506A's inconsistent behavior (relative to other users 506B-D), such as could be determined based on example view 500B of FIG. 5B. In still another example, prompt 510 can be displayed on the computing device of user 506A randomly, e.g., at a particular time in video call 502 or at a particular interval (e.g., at the beginning of video call 502, 10 minutes into video call 502, etc.). In still another example, prompt 510 can be displayed on the computing device of user 506A based on a request of another user 506D (e.g., the host of video call 502). Upon display of prompt 510, in some implementations, the computing device of user 506A can automatically toggle user control 508B to turn off audio capture within video call 502, such that user 506A's response to prompt 510 cannot be heard by other users 506B-D in video call 502, and video call 502 can continue uninterrupted. In some implementations, the word selected for prompt 510 can be a randomly generated or less commonly used word, such that user 506A is unlikely to predict and prerecord the word he is prompted to speak. Although shown in example view 500C as being displayed on the computing device of user 506A, it is contemplated that, in some implementations, the liveness detection system can display prompt 510 on the respective computing devices of some or all of users 506A-D.

Figure 5D:
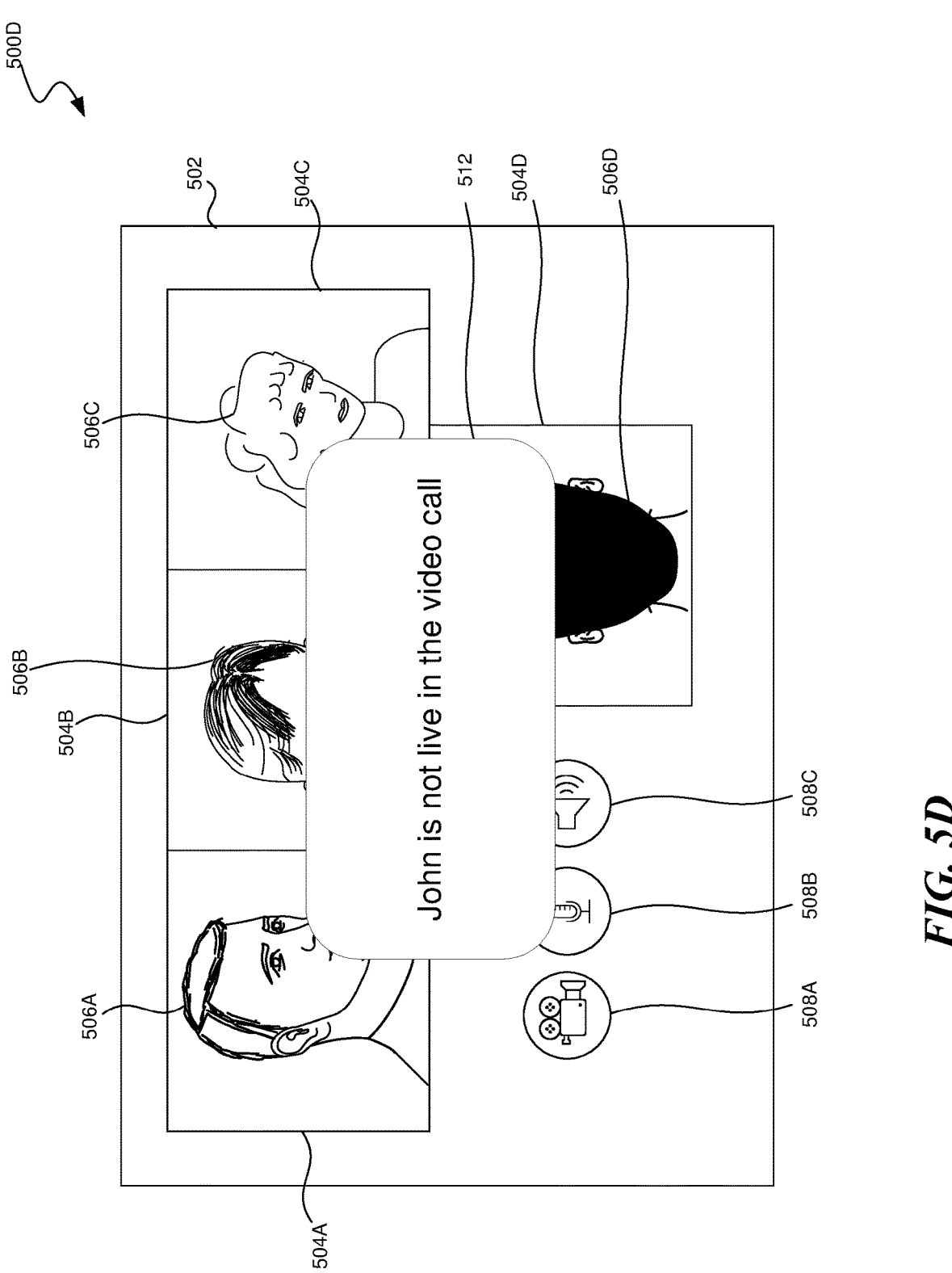
FIG. 5D is a conceptual diagram illustrating an example view on a computing device of a video call in which a user hosting the video call is notified that another user is not live in the video call.

FIG. 5D is a conceptual diagram illustrating an example view 500D on a computing device of a video call 502 in which a user 506D hosting the video call 502 is notified that another user 506A is not live in the video call. A liveness detection system (e.g., liveness detection system 164 of FIG. 1) can determine that user 506A is not live in video call 502 based on any one or more of a number of factors described herein. For example, the liveness detection system can determine that user 506A is not live in video call 502 based on his inconsistent movements (as shown in example view 500B of FIG. 5B) and/or based on his incorrect response or lack of response to prompt 510 of FIG. 5C. Upon determination that video feed 504A of user 506A has been prerecorded, the liveness detection system can cause notification 512 to display on the computing device of user 506D who, in some implementations, can be the host or initiator of video call 502.

Figure 6:
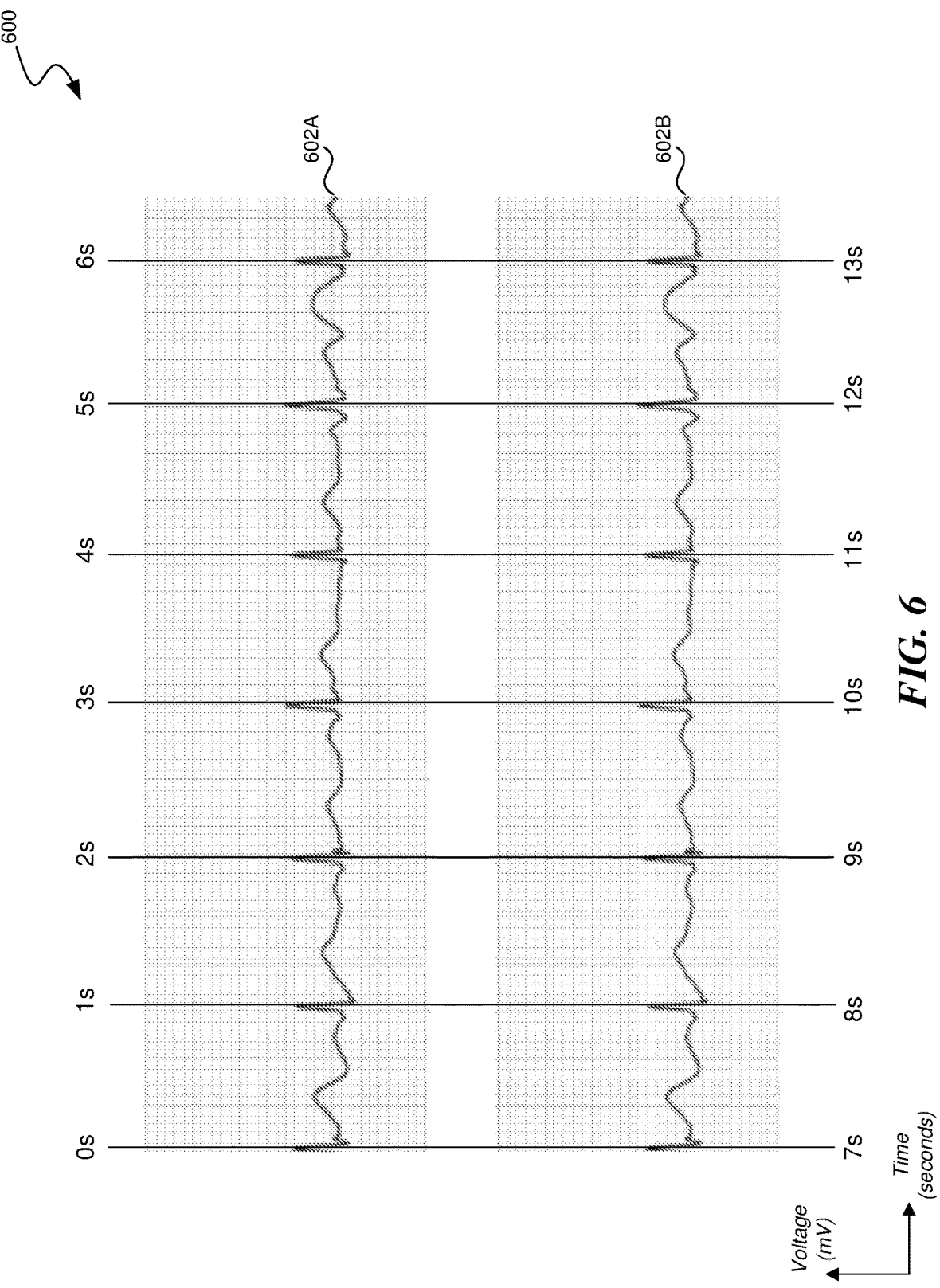
FIG. 6 is a conceptual diagram illustrating example graphs of pulse readings in which loop detection can be performed to determine liveness in a video call in some implementations.

FIG. 6 is a conceptual diagram illustrating example graphs 600 of pulse readings 602A-B in which loop detection can be performed to determine liveness in a video call in some implementations. In some implementations, a liveness detection system (e.g., liveness detection system 164 of FIG. 1) can obtain pulse readings 602A-B from a user over a particular time period (e.g., 13 seconds). For example, the liveness detection system can cause an infrared camera, on a computing device of a user in the video call, to capture pulse readings 602A-B. In another example, the liveness detection system can cause another device, in operable communication with the computing device, of the user in the video call to capture pulse readings 602A-B, such as a wearable device (e.g., a smart wristband). In still another example, the liveness detection system can obtain a file including pulse readings 602A-B from the computing device of the user in the video call. Thus, in some circumstances, it can be unclear if pulse readings 602A-B have been captured in real-time when requested by the liveness detection system.

The liveness detection system can receive pulse readings 602A-B and analyze the waveforms to determine patterns in the waveforms. For example, the liveness detection system can analyze pulse readings 602A-B to identify features occurring at particular intervals, e.g., every second on the second. In some implementations, the liveness detection system can analyze pulse readings 602A-B to identify the points in time, amplitude, and/or frequency of the P, Q, S, and/or T characteristics of pulse readings 602A-B. In some implementations, the liveness detection system can analyze pulse readings 602A-B to identify the length, amplitude, frequency, and/or other characteristics of the PR interval, PR segment, QR complex, ST segment, and/or QT interval of pulse readings 602A-B. The liveness detection system can then analyze pulse readings 602A-B to determine whether such features are repeated in pulse readings 602A-B over a period of time. For example, based on the analysis of the various characteristics of pulse readings 602A-B, the liveness detection system can detect that pulse readings 602A-B are looped every 7 seconds, and thus are prerecorded pulse readings of the user. Thus, in some implementations, the liveness detection system can determine, based on looped pulse readings 602A-B, that the user is not live in the video call.

Figure 7:
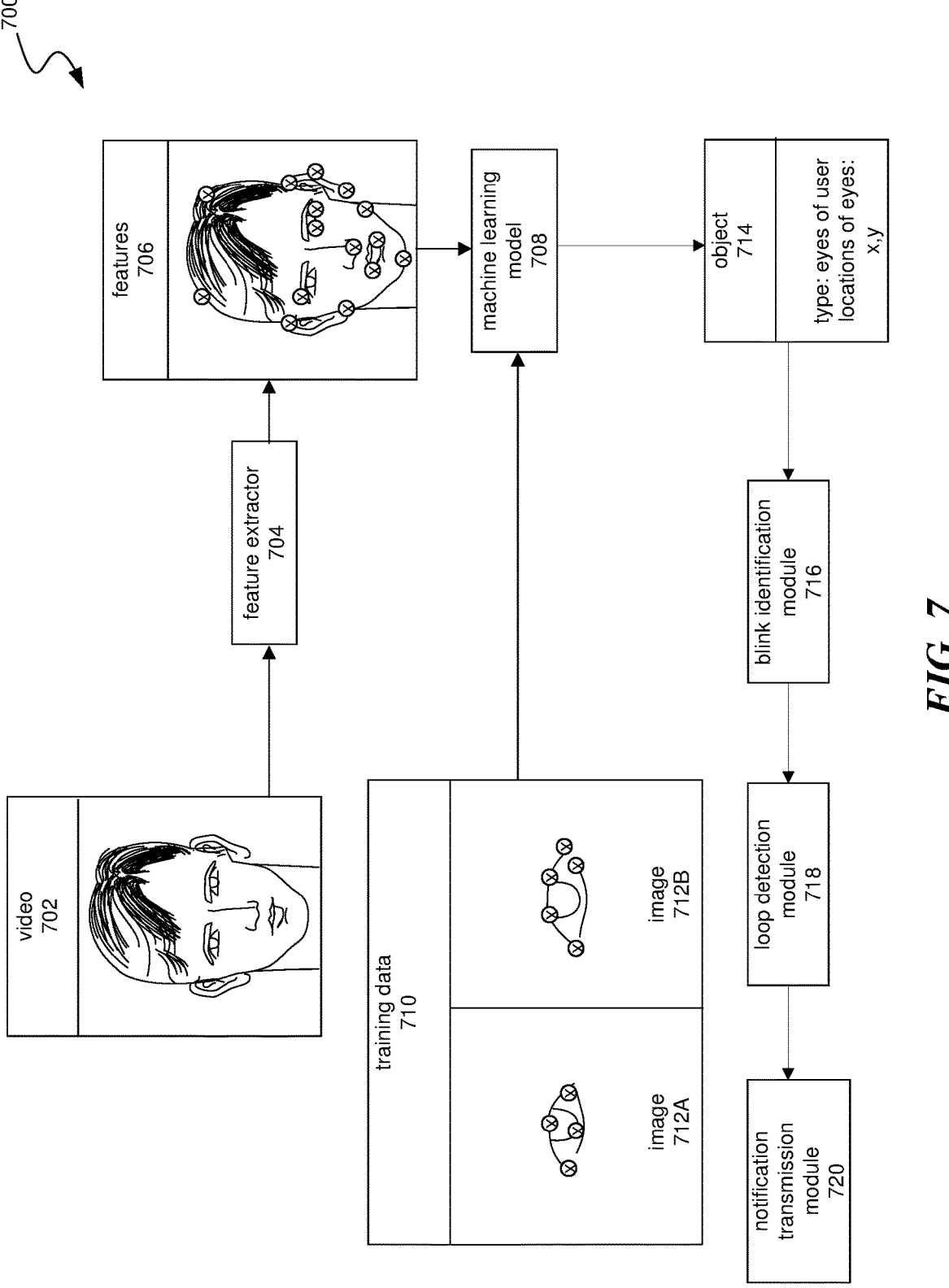
FIG. 7 is a flow diagram illustrating a process for performing loop detection to determine liveness in a video call based on eye recognition and a blinking pattern.

FIG. 7 is flow diagram illustrating a process 700 for performing loop detection to determine liveness in a video call based on eye recognition and a blinking pattern. A computing device can capture video 702 of a user in a video call. In some implementations, the computing device can be, for example, a computing device of the user being used to access the video call, and the camera of the computing device can capture video 702. In some implementations, the computing device can be a computing device of another user accessing the video call that is viewing video 702 of the user as a video feed in the video call. Video 702 can be fed into feature extractor 704 that can identify relevant features 706 in video 702. Relevant features 706 can correspond to, for example, edges, corners, shapes, curvatures, colors, or textures, or any combination thereof. Relevant features 706 can be fed into machine learning model 708.

Machine learning model 708 can obtain training data 710 including labeled eyes with identified features; for example, in image 712A of a user's eye and image 712B of a same or different user's eye. Although illustrated as training data 710 including two images 712A-B of known, identified eyes, it is contemplated that training data 710 can include any number of hundreds or thousands of images of eyes. Machine learning model 708 can compare relevant features 706 to training data 710 to determine a match score between relevant features 706 and training data 710. In this case, machine learning model 708 can determine both that eyes are present and the location of the eyes in video 702 with a particular certainty, e.g., having a match score above a threshold with training data 710.

A "machine learning model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model can be a neural network with multiple input nodes that receive data about captured facial images or video. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be interpreted as wave properties. In some implementations, such neural networks, known as deep neural networks, can have multiple layers of intermediate nodes with different configurations, can be a combination of models that receive different parts of the input and/or input from other parts of the deep neural network, or are convolutions or recurrent-partially using output from previous iterations of applying the model as further input to produce results for the current input.

A machine learning model can be trained with supervised learning, where the training data includes facial images as input and a desired output, such as an identified eye or eyes. A facial image can be provided to the model. Output from the model can be compared to the desired output for that input and, based on the comparison, the model can be modified, such as by changing weights between nodes of the neural network or parameters of the functions used at each node in the neural network (e.g., applying a loss function).

After applying the input in the training data and modifying the model in this manner, the model can be trained to evaluate new data. Similar training procedures can be used for the various machine learning models discussed above.

Machine learning model 708 can output data 714 indicating that video 702 includes eyes, characteristics of the eyes, and/or the locations of the eyes, which can be fed into blink identification module 716. Blink identification module 716 can identify the eyes and locations of the eyes from data 714, and analyze video 702 to determine a blinking pattern of the eyes in video 702. For example, blink identification module 716 can determine the blinking pattern based on the display (or lack of display) of particular features of the eyes, such as the iris, the pupil, the sclera, etc., which are not visible when the eyes are closed. In some implementations, blink identification module 716 can determine the blinking pattern by applying another machine learning model (not shown) trained on known, identified blinks in videos of eyes. Once blinks are identified, blink identification module 716 can determine a time of blinking in video 702, an interval between blinks in video 702, a length of blinks, etc., which can be unlikely to be consistently repeated in pattern or succession throughout the video call.

Blink identification module 716 can provide the determined blinking pattern (and any other associated data) to loop detection module 718, which, in some implementations, can be similar to loop detection module 346 of FIG. 3. Loop detection module 718 can, based on the blinking pattern in video 702, determine whether the video 702 is prerecorded. For example, loop detection module 718 can determine whether the blinking pattern is repeated consecutively in video 702 based on, for example, a pattern of time of blinking, intervals between blinks, length of blinks, etc., in video 702. If loop detection module 718 determines that the blinks in video 702 are looped, loop detection module 718 can provide an indication that video 702 is prerecorded to notification transmission module 720, which can be similar to notification transmission module 352 of FIG. 3 in some implementations. Notification transmission module 720 can transmit a notification that video 702 is prerecorded to one or more computing devices, such as another computing device accessing the video call, or a central computing device tracking attendance or participation in the video call.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing liveness detection in video calls, the method comprising:

facilitating rendering of multiple video feeds corresponding to multiple users in a video call, the multiple users accessing the video call from respective computing devices;

determining that a video feed, of the multiple video feeds, corresponding to a user, of the multiple users, is prerecorded, by:

detecting looping in the video feed of the user by detecting that a motion pattern, of the user in the video feed, is repeated multiple times at a particular same periodic interval over a period of time during the video call; and transmitting a notification, to at least one computing device of at least one respective user, of the multiple users, that the video feed corresponding to the user is prerecorded.

2. The method of claim 1, wherein determining that the video feed is prerecorded is further performed by providing a prompt to the user and comparing a response to an expected response, and wherein the expected response is a biometric response.

3. The method of claim 2, wherein the expected response includes at least one of a pulse, a breathing pattern, a blinking pattern, a fingerprint, or any combination thereof, of the user.

4. The method of claim 2, further comprising:

providing other prompts to other users and comparing other responses to the expected response, the other responses being biometric responses;

wherein at least one of the other responses are collected by at least one other device in operable communication with at least one respective computing device, and wherein the at least one other device includes at least one of a mobile phone, a wearable device, or both.

5. The method of claim 2, wherein providing the prompt includes causing an increase in light emitted from the computing device of the user, and wherein the expected response includes eye dilation of the user.

6. The method of claim 1, wherein determining that the video feed is prerecorded is further performed by providing a prompt to the user and comparing a response to an expected response, and wherein providing the prompt includes prompting the user to perform at least one of making a gesture, speaking at least one word, or both.

7. The method of claim 6, wherein the method further comprises:

causing the computing device to pause rendering of audio, video, or both, while providing the prompt and receiving the response.

8. The method of claim 6, wherein the method further comprises:

causing the computing device to pause capture of audio, video, or both, while providing the prompt and receiving the response.

9. The method of claim 1, wherein the detecting looping in the video feed of the user is performed based on a lack of audible participation by the user in the video call for a threshold duration of time.

10. The method of claim 1, wherein the motion pattern includes at least one of a repeated pulse pattern, a repeated breathing pattern, a repeated blinking pattern, or any combination thereof.

11. The method of claim 1, wherein determining that the video feed is prerecorded is further performed by providing a prompt to the user and comparing a response to an expected response, and wherein the response is the user not providing input for the prompt.

12. The method of claim 1, further comprising:

based on the determining that the video feed corresponding to the user is prerecorded, terminating access of the user to the video call via the respective computing device of the user.

13. The method of claim 1, wherein receipt of the notification, by a computing device, of the at least one computing device, of a respective user, of the at least one respective user, that the video feed corresponding to the user is prerecorded causes the computing device to terminate access of the user to the video call via the respective computing device of the user.

14. A non-transitory computer-readable storage medium storing instructions that, when executed by a computing system, cause the computing system to perform a process for providing liveness detection in video calls, the process comprising:

determining that a video feed, is prerecorded, wherein the video feed is one of multiple video feeds corresponding to multiple users in a video call, corresponding to a user, of multiple users accessing the video call from respective computing devices, by detecting looping in the video feed of the user by detecting that a motion pattern, of the user in the video feed, is repeated multiple times at a particular same periodic interval over a period of time during the video call; and transmitting a notification, to at least one computing device of at least one respective user, of the multiple users, that the video feed corresponding to the user is prerecorded.

15. The non-transitory computer-readable storage medium of claim 14, wherein determining that the video feed is prerecorded is further performed by providing a prompt to the user and comparing a response to an expected response, and wherein the expected response is a biometric response.

16. The non-transitory computer-readable storage medium of claim 15, wherein the process further comprises:

providing other prompts to other users and comparing other responses to the expected response, the other responses being biometric responses;

wherein at least one of the other responses are collected by at least one other device in operable communication with at least one respective computing device, and wherein the at least one other device includes at least one of a mobile phone, a wearable device, or both.

17. The non-transitory computer-readable storage medium of claim 15, wherein providing the prompt includes causing an increase in light emitted from the computing device of the user, and wherein the expected response includes eye dilation of the user.

18. A computing system for providing liveness detection in video calls, the computing system comprising:

one or more processors; and one or more memories storing instructions that, when executed by the one or more processors, cause the computing system to perform a process comprising:

determining that a video feed, is prerecorded, wherein the video feed is one of multiple video feeds corresponding to multiple users in a video call, corresponding to a user, of multiple users accessing the video call from respective computing devices, by detecting looping in the video feed of the user by detecting that a motion pattern, of the user in the video feed, is repeated multiple times at a particular same periodic interval over a period of time during the video call; and transmitting a notification, to at least one computing device of at least one respective user, of the multiple users, that the video feed corresponding to the user is prerecorded.

19. The computing system of claim 18, wherein determining that the video feed is prerecorded is further performed by providing a prompt to the user and comparing a response to an expected response, and wherein providing the prompt includes prompting the user to perform at least one of making a gesture, speaking at least one word, or both.

20. The computing system of claim 18, wherein the detecting looping in the video feed of the user is performed based on a lack of audible participation by the user in the video call for a threshold duration of time.

\* \* \* \* \*